(12) United States Patent
Fukumoto et al.

(10) Patent No.: US 8,142,907 B2
(45) Date of Patent: Mar. 27, 2012

(54) ALUMINUM ALLOY BRAZING SHEET HAVING HIGH-STRENGTH AND PRODUCTION METHOD THEREFOR

(75) Inventors: Atsushi Fukumoto, Tokyo (JP); Hiroshi Kano, Tokyo (JP); Akio Niikura, Tokyo (JP); Yoichiro Bekki, Tokyo (JP); Kenji Negura, Aichi (JP); Tatsuo Ozaki, Aichi (JP); Toshihide Ninagawa, Aichi (JP); Keiichi Okazaki, Aichi (JP)

(73) Assignees: Furukawa-sky Aluminum Corp, Tokyo (JP); Denso Corporation, Aichi (JP)

( * ) Notice: Subject to any disclaimer, the term of this patent is extended or adjusted under 35 U.S.C. 154(b) by 712 days.

(21) Appl. No.: 12/218,440

(22) Filed: Jul. 15, 2008

(65) Prior Publication Data

US 2009/0020585 A1    Jan. 22, 2009

(30) Foreign Application Priority Data

Jul. 19, 2007   (JP) .................. 2007-188856
Jul. 19, 2007   (JP) .................. 2007-188857

(51) Int. Cl.
*B23K 35/28* (2006.01)
*B32B 15/01* (2006.01)
*B32B 15/20* (2006.01)
*C22C 22/00* (2006.01)
*C22C 22/02* (2006.01)

(52) U.S. Cl. .................. 428/654; 228/235.2; 228/262.5

(58) Field of Classification Search .................. None
See application file for complete search history.

(56) References Cited

U.S. PATENT DOCUMENTS

2007/0215674 A1    9/2007   Yamada
2011/0111254 A1    5/2011   Wittebrood et al.

FOREIGN PATENT DOCUMENTS

| EP | 1 803 525 A1 | | 4/2007 |
|---|---|---|---|
| JP | 04263033 A | * | 9/1992 |
| JP | 08-246117 | | 9/1996 |
| JP | 2006131923 A | * | 5/2006 |
| WO | 2010/000666 A1 | | 1/2010 |

OTHER PUBLICATIONS

English machine translation of JP 2006131923 A (published in Japanese May 25, 2006), translation dated May 19, 2011.*
English translation of JP 04-263033—Translated by Schreiber Translations, Inc. Jun. 2011.*

* cited by examiner

*Primary Examiner* — Jennifer McNeil
*Assistant Examiner* — Adam Krupicka
(74) *Attorney, Agent, or Firm* — Carrier Blackman & Associates, P.C.; Joseph P. Carrier; William D. Blackman

(57) ABSTRACT

An aluminum alloy brazing sheet having high strength comprising:
a core alloy; an Al—Si-based filler alloy cladded on one side or both sides of the core alloy, wherein the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities; and wherein, after the aluminum alloy brazing sheet is subjected to brazing, the core alloy features a metallic structure in which a density of intermetallic compounds having a grain diameter of at least 0.1 µm is at most ten grains per µm$^2$.

20 Claims, No Drawings

ALUMINUM ALLOY BRAZING SHEET HAVING HIGH-STRENGTH AND PRODUCTION METHOD THEREFOR

FIELD OF THE INVENTION

The present invention relates to an aluminum alloy brazing sheet that can be in a heat exchanger for an automobile, in particular, to an aluminum alloy brazing sheet having high strength that can be preferably used as a cooling water- or refrigerant-passage forming material for a heat exchanger, such as a radiator or a condenser, and a production method therefor.

BACKGROUND OF ART

An aluminum alloy is lightweight and has high thermal conductivity, and thus is used in a heat exchanger for an automobile, for example, a radiator, a condenser, an evaporator, a heater or an intercooler. The heat exchanger for the automobile is mainly produced via brazing. In general, brazing is conducted at a high temperature of about 600° C., by using an Al—Si-based filler alloy.

An aluminum alloy heat exchanger to be produced through brazing is formed of a corrugated fin for mainly conducting heat radiation and a tube for circulating cooling water or refrigerant. In the case where the tube is broken and pierced, the cooling water or refrigerant inside the tube leaks. Thus, an aluminum alloy brazing sheet having excellent strength after brazing is essential for extending a life of a product using the same.

In recent years, a demand for reduction in weight of an automobile has been increasing, and corresponding reduction in weight of an automobile heat exchanger has been required. Thus, reduction in thickness of each member forming the heat exchanger has been studied, since there is a need of an aluminum ally brazing sheet having further improved strength after brazing.

Hitherto, a tube material of a heat exchanger in which cooling water circulates inside the tube, such as a radiator or a heater for an automobile, generally employs a three layer tube material obtained by: cladding a sacrificial anode material, such as Al—Zn-based alloy, on an inner surface of a core alloy, such as an Al—Mn-based alloy typified by JIS 3003 alloy; and cladding a filler alloy, such as Al—Si-based alloy, on an atmospheric side of the core alloy. However, the mechanical strength after brazing of the clad material employing the JIS 30003 core alloy is about 110 MPa (110 N/mm$^2$), which is insufficient.

It has been proposed that coarsening of precipitated grain is suppressed to thereby improve mechanical strength of an aluminum alloy brazing sheet by suitably regulating conditions for homogenization treatment of a core alloy and by keeping the core alloy at the temperature of less than 500° C. before hot rolling (JP-A-8-246117). However, in this producing process, a beginning temperature and an ending temperature for hot rolling cannot be taken into consideration, and there is a possibility that the intermetallic compounds, which exert a negative influence on an aging hardening effect based on Mg$_2$Si after brazing, is precipitated, resulting in a problem that the aluminum alloy brazing sheet can not have a sufficient strength after brazing.

In order to satisfy demands for reduction in thickness of an aluminum alloy brazing sheet, properties such as strength after brazing must be improved. However, conventional techniques have difficulties in assuring properties with a small thickness, while attaining higher strength simultaneously.

SUMMARY OF THE INVENTION

The present invention contemplates providing an aluminum alloy brazing sheet having favorable brazing properties without causing diffusion of filler alloy during brazing, and having excellent strength after brazing, in particular, which can be used as a fluid passage forming material of an automobile heat exchanger, in order to solve the problems in the conventional techniques, and providing a method for producing thereof.

According to researches of the inventors, it has been found that a clad material featuring specific alloy compositions and a specific alloy structure suits the object of the invention, resulting in achievement of the present invention.

(1) According to a first aspect of the present invention, there is provided an aluminum alloy brazing sheet having high strength comprising: a core alloy; an Al—Si-based filler alloy cladded on one side or both sides of the core alloy, wherein the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities; and wherein, after the aluminum alloy brazing sheet is subjected to brazing, the core alloy features a metallic structure in which a density of intermetallic compounds having a grain diameter of at least 0.1 μm is at most ten grains per μm$^2$.

(2) Also, according to the first aspect of the present invention, there is provided another aluminum alloy brazing sheet having high strength comprising: a core alloy; an Al—Si-based filler alloy cladded on one side of the core alloy; and a sacrificial anode material cladded on the other side of the core alloy, wherein the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities;

wherein the sacrificial anode material is composed of an aluminum alloy containing 2.0-6.0% Zn, the balance Al and unavoidable impurities; and wherein, after the aluminum alloy brazing sheet is subjected to brazing, the core alloy features a metallic structure in which a density of intermetallic compounds having a grain diameter of at least 0.1 μm is at most ten grains per μm$^2$.

(3) Furthermore, there is provided yet another aluminum alloy brazing sheet having high strength comprising: a core alloy; an Al—Si-based filler alloy cladded on one side of the core alloy; and a sacrificial anode material cladded on the other side of the core alloy, wherein the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities; wherein the sacrificial anode material is composed of an aluminum alloy containing 2.0-6.0% Zn, and containing one or more elements selected from the group consisting of 0.05-4.0% Si, 0.05-1.8% Mn, 0.02-0.3% Ti and 0.02-0.3% V, the balance of Al and unavoidable impurities; and wherein, after the aluminum alloy brazing sheet is subjected to brazing, the core alloy features a metallic structure in which a density of intermetallic compounds having a grain diameter of at least 0.1 μm is at most ten grains per μm².

(4) In the aluminum alloy brazing sheet having high strength as set forth in above (1)-(3), a crystallized grain diameter of the core alloy after brazing is at least 100 μm.

(5) According to a second aspect of the present invention, there is provided a method for producing an aluminum alloy brazing sheet having high strength, which method comprises the steps of: preparing a core alloy having one side and the other side, the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities; cladding an Al—Si-based filler alloy on one side or both sides of the core alloy; and subjecting the resultant cladded alloy materials to hot rolling such that a beginning temperature of hot rolling ranges from 380 to 480° C., and such that a finishing temperature of hot rolling ranges from 200 to 280° C., wherein, after the aluminum alloy brazing sheet is subjected to brazing, the core alloy features a metallic structure in which a density of intermetallic compounds having a grain diameter of at least 0.1 μm is at most ten grains per μm².

(6) According to the second aspect of the present invention, there is provided another method for producing an aluminum alloy brazing sheet having high strength, which method comprises the steps of: preparing a core alloy having one side and the other side, the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities; cladding an Al—Si-based filler alloy on one side of the core alloy; cladding a sacrificial anode material on the other side of the core alloy, the sacrificial anode material is composed of an aluminum alloy containing 2.0-6.0% Zn, the balance Al and unavoidable impurities; and subjecting the resultant cladded materials to hot rolling such that a beginning temperature of hot rolling ranges from 380 to 480° C., and such that a finishing temperature of hot rolling ranges from 200 to 280° C., wherein, after the aluminum alloy brazing sheet is subjected to brazing, the core alloy features a metallic structure in which a density of intermetallic compounds having a grain diameter of at least 0.1 μm is at most ten grains per μm².

(7) According to the second aspect of the present invention, there is provided yet another method for producing an aluminum alloy brazing sheet having high strength, which method comprises the steps of: preparing a core alloy having one side and the other side, the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities; cladding an Al—Si-based filler alloy on one side of the core alloy; cladding a sacrificial anode material on the other side of the core alloy, the sacrificial anode material is composed of an aluminum alloy containing 2.0-6.0% Zn, and containing one or more elements selected from the group consisting of 0.05-1.0% Si, 0.05-1.8% Mn, 0.02-0.3% Ti and 0.02-0.3% V, the balance of Al and unavoidable impurities; and subjecting the resultant cladded materials to hot rolling such that a beginning temperature of hot rolling ranges from 380 to 480° C., and such that a finishing temperature of hot rolling ranges from 200 to 280° C., wherein, after the aluminum alloy brazing sheet is subjected to brazing, the core alloy features a metallic structure in which a density of intermetallic compounds having a grain diameter of at least 0.1 μm is at most ten grains per μm².

(8) In the method of producing an aluminum alloy brazing sheet having high strength as set forth in above (5)-(7) further comprises the step of subjecting the aluminum alloy brazing sheet to at least one annealing, after hot rolling, at a temperature range from 250 to 400° C. for at least one hour.

(9) In the method for producing the aluminum alloy brazing sheet having high strength as set forth in above (5)-(8), a crystallized grain diameter of the core alloy after brazing is at least 100 μm.

Effects of the Invention

According to the present invention, it is possible to produce aluminum alloy brazing sheets which have excellent brazing properties such as fin bonding rate and erosion resistance in spite of a small thickness and which show high strength after brazing. The aluminum alloy brazing sheet has a small thickness, is excellent in view of lightness and thermal conductivity for a heat exchanger of automobiles, and has high strength after brazing. As a result, it is possible to further prolong a life of the heat exchanger.

DETAILED DESCRIPTION OF THE INVENTION

Preferable embodiments of the aluminum alloy brazing sheet according to the present invention and the method therefor will now be described below.

Description will be given of reasons and addition ranges for component elements to be added to the core alloy and the sacrificial anode material, which form the aluminum alloy brazing sheet of the present invention, and description will also be given of the filler alloy.

1. Core Alloy

Si forms, together with Fe and Mn, an Al—Fe—Mn—Si-based compound, acts to cause dispersion strengthening or solid solution strengthening by forming a solid solution in a matrix, to thereby enhance mechanical strength. Further, Si improves strength by reacting with Mg to form $Mg_2Si$ compounds. The Si content ranges from 0.3 to 1.2% (% in a composition refers to mass %, the same applies below). If the Si content is less than 0.3%, it provides a small effect of Si; and if the Si content is more than 1.2%, it lowers a melting point of the core alloy and may be apt to cause melting. The Si content is ranges, preferably from 0.5 to 1.0%, more preferably from 0.6 to 0.9%.

Fe is apt to form intermetallic compounds of a size which may serve as a recrystallization nucleus. In order to coarsen crystallized grain diameter after brazing to thereby suppress a brazing-diffusion, the Fe content ranges from 0.05 to 0.4%. If the Fe content is less than 0.05%, a high-purity aluminum base must be used, resulting in an increase in production cost. Also, if the Fe content is more than 0.4%, the diameter of the crystallized grains too small after brazing, and thus the brazing-diffusion may be caused. The Fe content ranges, preferably from 0.1 to 0.3%, more preferably from 0.1 to 0.2%.

Cu improves strength through solid solution strengthening, provides an electrically more positive potential to the core alloy, to increase a potential difference with potentials of the sacrificial anode material and a fin material, and improves the corrosion resistance effect by the sacrificial anode effect. The Cu content ranges from 0.3 to 1.2%. If the Cu content is less than 0.3%, it provides a small effect of Cu; and if the Cu content is more than 1.2%, it may be apt to cause grain boundary corrosion. The Cu content ranges, preferably from 0.3 to 1.0%, more preferably from 0.3 to 0.9%.

Mn has an effect of improving strength, brazing properties and corrosion resistance, and providing an electrically more positive potential. The Mn content ranges from 0.3 to 1.8%. If the Mn content is less than 0.3%, it provides a small effect of Mn; and if the Mn content is more than 1.8%, it apt to allow formation of a coarse intermetallic compounds upon casting, and to degrade plastic working properties. The Mn content ranges, preferably from 1.0 to 1.6%, more preferably, from 1.1 to 1.5%.

Mg has an effect of improving strength through $Mg_2Si$ precipitation. The Mg content ranges from 0.05 to 0.6%. If the Mg content is less than 0.05, it provides a small effect of Mg; and if the Mg content is more than 0.6%, brazing properties are degraded. The Mg content ranges, preferably from 0.1 to 0.4%, more preferably from 0.15 to 0.4%.

The core alloy of the present invention further contains at least one of Ti, Zr, Cr and V.

Ti improves strength through solid solution strengthening and improves corrosion resistance. The preferred Ti content ranges from 0.02 to 0.3%. If the Ti content is less than 0.02%, it provides no effect of Ti; and if the Ti content is more than 0.3%, it is apt to allow formation of a coarse intermetallic compound and degrade plastic working properties. The Ti content ranges, preferably from 0.05 to 0.2%, more preferably from 0.1 to 0.2 wt %, most preferably from 0.1 to 0.15%.

Zr improves strength through solid solution strengthening and causes precipitation of Al—Zr-based fine compounds to thereby contribute to coarsening of crystallized grains after brazing. The preferred Zr content ranges from 0.02 to 0.3%. If Zr content is less than 0.02%, it provides no effect of Zr; and if the Zr content is more than 0.3%, it is apt to allow formation of a coarse intermetallic compound and degrade plastic working properties. The Zr content ranges, preferably from 0.05 to 0.2%, more preferably from 0.1 to 0.2%, most preferably from 0.1 to 0.15%.

Cr improves strength through solid solution strengthening and improves corrosion resistance. The preferred Cr content ranges from 0.02 to 0.3%. If Cr content is less than 0.02%, it provides no effect of Cr; and if the Cr content is more than 0.3%, it is apt to allow formation of a coarse intermetallic compound and degrade plastic working properties. The Cr content ranges preferably from 0.1 to 0.2%.

V improves strength through solid solution strengthening and improves corrosion resistance. The preferred V content ranges from 0.02 to 0.3%. If Cr content is less than 0.02%, it provides no effect of V; and if the V content is more than 0.3%, it is apt to allow formation of a coarse intermetallic compound and degrade plastic working properties. The V content ranges, preferably from 0.05 to 0.2%, more preferably from 0.1 to 0.2%, most preferably from 0.1 to 0.15%.

2. Sacrificial Anode Material

Zn provides an electrically more negative potential to the sacrificial anode material, and improves corrosion resistance by the sacrificial anode effect by forming a potential difference between the sacrificial anode material and the core alloy. The Zn content ranges from 2.0 to 6.0%. If Zn content is less than 2.0%, it provides an insufficient effect of Zn; and if the Zn content is more than 6.0%, it increases an corrosion speed such that the sacrificial anode material is corroded and lost an early stage, and degrades corrosion resistance. The Zn content ranges, preferably from 2.0 to 5.0%, more preferably from 3.0 to 5.0%.

Si forms, together with Fe and Mn, an Al—Fe—Mn—Si-based compound, acts to cause dispersion strengthening or solid solution strengthening by forming a solid solution in a matrix, to thereby enhance mechanical strength. Further, Si improves strength by reacting with Mg diffusing from the core alloy upon brazing, to form $Mg_2Si$ compounds. The preferred Si content ranges from 0.05 to 1.0%. If the Si content is more than 1.0%, it lowers a melting point of the sacrificial anode material and may be apt to cause melting. Further, it provides an electrically more positive potential to the sacrificial anode material, and thus the sacrificial anode effect is obstructed and the corrosion resistance effect is degraded. If the Si content is less than 0.05%, it is insufficient to enhance mechanical strength. The Si content ranges, more preferably from 0.05 to 0.8%, most preferably from 0.1 to 0.8%.

Mn has an effect of improving strength and corrosion resistance. The preferred Mn content ranges from 0.05 to 1.8%. If the Mn content is more than 1.8%, it apt to allow formation of a coarse intermetallic compounds upon casting, and to degrade plastic working properties. Further, it provides an electrically more positive potential to the sacrificial anode material, and thus the sacrificial anode effect is obstructed and the corrosion resistance effect is degraded. If the Mn content is less than 0.05%, it is insufficient to enhance mechanical strength. The Si content ranges, further preferably from 0.05 to 1.6%, more preferably from 0.05 to 1.5, most preferably from 0.1 to 1.0%.

Ti improves strength through solid solution strengthening and improves corrosion resistance. The preferred Ti content ranges from 0.02 to 0.3%. If the Ti content is less than 0.02%, it provides no effect of Ti; and if the Ti content is more than 0.3%, it is apt to allow formation of a coarse intermetallic compound and degrade plastic working properties. The Ti content ranges, preferably from 0.05 to 0.2%, more preferably from 0.1 to 0.2 wt %, most preferably from 0.1 to 0.15%.

V improves strength through solid solution strengthening and improves corrosion resistance. The preferred V content ranges from 0.02 to 0.3%. If Cr content is less than 0.02%, it provides no effect of V; and if the V content is more than 0.3%, it is apt to allow formation of a coarse intermetallic compound and degrade plastic working properties. The V content ranges, preferably from 0.05 to 0.2%, more preferably from 0.1 to 0.2%, most preferably from 0.1 to 0.15%.

At least one element of Si, Mn, Ti and V may be added to the sacrificial anode material, if necessary.

The sacrificial anode material may contain about 0.05-0.2 Fe as an unavoidable impurity.

3. Filler Alloy

As the filler alloy, use may be made of an Al—Si-based filler alloy usually used, and is not particularly limited. For example, JIS 4343, JIS 4045 and JIS 4047 alloys (Al-7 to 13% Si) are preferred.

After the aluminum alloy brazing sheet according to the present invention is subjected to brazing process, a metal structure of the core alloy is characterized by intermetallic compounds, such as Al—Mn, Al—Mn—Si, Al—Fe—Mn—Si and so forth, having the grain diameter of at least 0.1 μm, and featuring the density (the number of grains) of at most $10/\mu m^2$, more preferably, at most $5/\mu m^2$. Although it is intended that the strength of the aluminum alloy brazing sheet according to the present invention mainly relies on strengthening by the aging hardening based on $Mg_2Si$. However, in a case where the intermetallic compounds having the grain diameter of at least 0.1 μm exist in the core alloy after brazing, $Mg_2Si$ is precipitated on the surfaces of the intermetallic compounds during a cooling process after brazing so that an amount of $Mg_2Si$, which can not contribute to the aging hardening, may be increased. As a result, Mg and Si added to the core alloy can not effectively participate in an improvement of the strength of the core alloy, so that there may be a possibility that a sufficient strength of the core alloy after brazing can not be obtained. Accordingly, in order that the aging hardening based on $Mg_2Si$ can be effectively obtained, the intermetallic compounds having the grain diameter of at least 0.1 μm existing in the core alloy after brazing must feature the density of at most $10/\mu m^2$, more preferably, at most $5/\mu m^2$. After brazing, in order that the density of the intermetallic compounds having the grain diameter of at least 0.1 μm in the core alloy must be at most $10/\mu m^2$, for example, in the aluminum alloy brazing sheet before brazing, it is significant to lower a density of coarse sized intermetallic compounds in the core alloy as much as possible. Fine sized intermetallic compounds are re-dissolved and disappears during brazing, whereas the coarse sized intermetallic compounds still remain without being re-dissolved after brazing.

In the present invention, the density of the intermetallic compounds having the grain size of at least 0.1 μm is determined, as follows. An L-LT section of the core alloy, defined by two directions L and LT, is exposed by a polishing process. Note that the direction L is defined as a rolling direction, and that the direction LT is defined as one which is perpendicular to the rolling direction "L", and which is in parallel with a rolling face. Then, the core alloy exposed by polishing process is observed by using a transmission electron microscope (TEM). A thickness was optically measured by using an interference fringe, and areas having a 0.1-0.3 thickness were selected as TEM observation areas. Then, TEM photographs obtained are subjected to an image-analyzing process to thereby determine the density of the intermetallic compounds after brazing. Note that a size of each of the intermetallic compounds was defined as a diameter of a circle corresponding to the intermetallic compound concerned.

Also, according to the present invention, in addition to the fact that the density of the intermetallic compounds having the grain size of at least 0.1 μm in the metallic structure after brazing features at most $10/\mu m^{=2}$, it is preferable that a crystallized grain diameter of the core alloy features is at least 100 μm after brazing. During brazing, the melted filler alloy may be diffused into the core alloy through the grain boundaries, thereby causing corrosion. The diameter of the crystallized grains after brazing is smaller, whereby the number of grain boundaries through which the melted filler alloy can be diffused is more increased. Thus, an amount of the melted filler alloy to be diffused into the core alloy becomes more, so that the corrosion is more facilitated. The occurrence of the corrosion causes degradation in the properties such as the strength, the corrosion resistance and so forth after brazing, and an effective amount of the filler alloy to be used for bonding is reduced, resulting in degradation in brazing properties. Thus, it is desirable that the crystallized grain diameter of the core alloy after brazing is at least 100 μm, preferably, at least 150 μm. In order that the crystallized grain diameter of the core alloy after brazing can have the size of at least 100 μm, before the aluminum alloy brazing sheet is subjected to brazing, it is significant that the density of the coarse intermetallic compounds in the core alloy is made low as much as possible, and that the density of the fine sized intermetallic compounds in the core alloy is made high as much as possible. The coarse intermetallic compounds may serve as nucleus for recrystallization upon brazing. The more a number of the nucleus for the recrystallization, the more a number of the crystallized grains formed after brazing. As a result, the crystallized grain diameter becomes smaller. On the other hand, the fine sized intermetallic compounds have an effect for suppression of generation of the nucleus for the recrystallization. Namely, due to the effect for suppression of the generation of the nucleus, a number of the nucleus for the recrystallization is made small, and thus a number of the crystallized grains formed after brazing is made small too, so that the crystallized grain diameter becomes coarse.

The crystallized grain diameter in the core alloy was determined as follows. An L-LT face of the core alloy is exposed by a polishing process, and then subjected to a Barker etching process. The L-LT faces subjected to Barker etching process is photographed, using an optical microscope. Subsequently, an average of the crystallized grain diameter was determined from the photograph obtained, by using an area measurement method.

Next, the method of the present invention for producing an aluminum alloy brazing sheet will be described below.

The aluminum alloy brazing sheet according to the present invention is produced by: cladding an Al—Si-based filler alloy composed of the alloy described above on one side or both sides of the core alloy composed of the alloy described above, or by cladding an Al—Si-based filler alloy on one side of the core alloy and a sacrificial anode material composed of the alloy described above on the other side of the core alloy.

An aluminum alloy having the desired component composition described above for the core alloy and the sacrificial anode material is melted, cast, machine finished; subjected, before hot rolling, to homogenization treatment at a temperature range from 500 to 620° C., or no homogenization treatment, for the core alloy ingot; and then rolled to a desired thickness through hot rolling, to thereby obtain the core alloy and the sacrificial anode material. When the homogenization treatment is carried out under the temperature range from 500 to 620° C., the Al—Mn-based compounds can be sparsely distributed in the core alloy, so that it is possible to lower a density of the intermetallic compounds after brazing. On the other hand, when the core alloy is not subjected to the homogenization treatment, a solid-solution degree of the core alloy before hot rolling can be maintained at a high state, and thus the fine intermetallic compounds are precipitated during hot rolling. The fine intermetallic compounds are re-dissolved during brazing, so that it is possible to lower a density of the intermetallic compounds in the core alloy after brazing.

The thus-obtained core alloy and sacrificial anode material are combined with any known filler alloy. The combined material is hot rolled at 380 to 480° C. for a beginning temperature and at 200 to 280° C. for an ending temperature, to thereby produce a clad material. Due to the fact that the beginning temperature of hot rolling is set to at most 480° C., it is possible to produce a fine intermetallic compounds in the core alloy after hot rolling is completed. When the beginning temperature of hot rolling is more than 480° C., the inermetallic compounds become coarse. By producing the fine precipitation upon hot rolling, the fine intermetallic compounds are re-dissolved in the matrix upon during brazing, to thereby it is possible to lower a density of the intermetallic compounds having a grain diameter of at least 0.1 μm after brazing. When the beginning temperature of hot rolling is less than 380° C., there is a large possibility that a sufficient press-adhesion can not be obtained between the core alloy and the cladding materials and thus it is difficult to appropriately produce the brazing sheet. Preferably, the beginning temperature of hot rolling should be set to fall within the range from 400 to 460° C. Due to the fact that the ending temperature of hot rolling is set to at most 280° C., it is possible to suppress precipitation in the coiled aluminum alloy sheet stock after hot rolling is completed. When the ending temperature of hot rolling is more than 280° C., precipitation or coarsening of the intermetallic compounds occur in the core alloy even after the aluminum alloy sheet stock is coiled, whereby a proper distribution of the intermetallic compounds can not be obtained. When the ending temperature of hot rolling is less than 200° C., it is difficult to release the strain forced in the clad material, and thus a large amount of strain is left in the clad material after hot rolling. Thus, cracks may occur upon cold rolling at the side of the clad material and thus rolling is difficult. Preferably, the ending temperature of hot rolling should be set to fall within the range from 220 to 260° C.

The resultant clad material is then cold rolled and subjected to at least one annealing at need. When annealing is carried out over at least one hour under an annealing temperature from 250 to 400° C., it is possible to further improve the characteristics of the clad material. When the annealing temperature is less than 250° C., a large amount of strain forced is left in the finally-obtained aluminum alloy brazing sheet stock. The large amount of strain makes a driving force for recrystallization upon brazing large, whereby a diameter of crystallized grains is made fine after brazing is completed. As a result, a diffusion of the filler alloy easily occurs in brazing. Further, a strength of the aluminum alloy brazing sheet stock is made too large, resulting in a hindrance to post-processes. When the annealing temperature is more than 400° C., there is a large possibility that precipitation or coarsening of the intermetallic compounds occur in the core alloy upon annealing. Preferably, the annealing temperature ranges from 280 to 370° C. As timing for annealing, either of an intermediate annealing upon an intermediate sheet thickness or a final annealing upon a final sheet thickness may be employed.

In short, the aluminum alloy brazing sheet stock may feature either Tempering "H1n" or Tempering "H2n".

In the present invention, a thickness of the aluminum alloy brazing sheet and respective clad ratios of both the clad materials are not especially restricted. For example, when the aluminum alloy brazing sheet is formed as a tube material which is used in a radiator, a condenser and so forth to circulate a cooling water or refrigerant, the aluminum alloy brazing sheet may have a thickness of at most about 0.3 mm, and both the sacrificial anode material layer and the filler alloy layer may features a usual clad ratio falling with the range from about 7 to about 20%. Also, when the aluminum alloy brazing sheet is formed as a tube material which is used in an intercooler and so forth, the aluminum alloy brazing sheet may have a thickness of at most about 0.8 mm, and both the sacrificial anode material layer and the filler alloy layer may features a clad ratio falling with the range from about 3 to about 15%. Further, when the aluminum alloy brazing sheet is formed as a plate coupled to a tube for constructing an heat exchanger, the aluminum alloy brazing sheet may have a thickness of at most about 1.6 mm, and both the sacrificial anode material layer and the filler alloy layer may features a usual clad ratio falling with the range from about 3 to about 10%.

The aluminum alloy brazing sheet according to the present invention has a small thickness, excellent mechanical strength and good brazing properties, and thus is preferable for production of a lightweight heat exchanger for an automobile.

EXAMPLES

Although the present invention is further explained based on some examples, it should be understood that the present invention is not restricted to these examples.

1. Examples 1-7 and 13-18, and Comparative Examples 8-10 and 19-21

Corresponding to the Test Material Nos. 1-7, 13-18, 8-10 and 19-21, Respectively An alloy for a core alloy and sacrificial anode material, having the metal components and composition as shown in Tables 1 and 2, was cast through DC casting, machine finished on both sides. A 4045 alloy was used as a filler alloy, and the filler alloy and sacrificial anode material were each hot rolled to a desired thickness, respectively. As shown in Table 3, the alloy materials were combined as the filler alloy/the core alloy/the sacrificial anode material, and clad ratios of the filler alloy and the sacrificial anode material were set to 15%. The resultant combination of materials was pressure bonded under hot rolling condition shown in Table 3, to thereby obtain a three-layer clad material having a thickness of 3.5 mm. Then, the resultant is processed under the step including annealing having the condition shown in Table 3 and made to a sheet having a thickness of 0.25 mm. The test material Nos. 1-10, 13-16 and 19-21 were cold rolled after hot rolling, then were intermediately annealed under the condition shown in Table 3, were further finally cold rolled, to thereby obtain the resultant test material having a final thickness of 0.25 mm. The test material No. 17 was cold rolled after hot rolling, to thereby obtain the resultant test material having a final thickness of 0.25 mm, and then was finally annealed under the condition shown in Table 3. The test material No. 18 was cold rolled after hot rolling, then was intermediately annealed under the condition shown in Table 3, and then was finally annealed, to thereby obtain the resultant test material having a final thickness of 0.25 mm. The resultant test material No. 18 was further secondary and finally annealed under the condition shown in Table 3

Then, a part of the thus-prepared sheet material was used as a sample, and the sample was subjected to measurements for a density of intermetallic compounds after brazing, a crystallized grain diameter after brazing, strength after brazing and brazing properties by the methods below. The results are shown in Table 4.

(1) Density of Intermetallic Compounds after Brazing:

After heat-brazing at 600° C. for 3 min, the sample was worked so that an L-LT section of the core alloy was exposed by a polishing process. Then, in the exposed sample, the core alloy is observed by using a transmission electron microscope (TEM). On the observation, in the sample, a thickness was optically measured by using an interference fringe, and ten areas having a 0.1-0.3 µm thickness were selected as observation areas. Then, the observation areas were observed and photographed by using a transmission electron microscope (TEM), and the photographs thus obtained were subjected to an image-analyzing process to thereby determine a density of intermetallic compounds having a grain diameter of at least 0.1 µm. The densities of intermetallic compounds is defined as a number of intermetallic compounds/µm$^2$, and the number is an average number derived from the ten observation areas.

(2) Crystallized Grain Diameter after Brazing:

After heat-brazing at 600° C. for 3 min, the sample was worked so that an L-LT face of the core alloy was exposed by a polishing process. Then, the L-LT faces of the sample was subjected to a Barker etching process. Subsequently, an average of the crystallized grain diameter was determined by using an area measurement method (see: Metal Institution Journal, 10 volumes (1971), pp. 279-289). The determination of the crystallized grain diameter was carried out only regarding the test material Nos. 1, 3, 6 and 7 and 8-10.

(3) Tensile Strength after Brazing:

After heat-brazing at 600° C. for 3 min, the sample was cooled at a cooling speed of 200° C./min, and was left standing at room temperature for 1 week. The sample was subjected to tensile strength test at normal temperature, under the condition of tensile speed 10 mm/min and gauge length 50 mm, according to JIS Z2241. The sample exhibiting a tensile strength of at least 180 N/mm² was estimated as being acceptable, and the sample exhibiting a tensile strength of less than 180 N/mm² was estimated as being unacceptable.

(4) Fin Bonding Rate:

An fin material of a JIS 3003 alloy to which 1.5 wt % Zn was added was formed into a corrugated shape, and attached to a filler alloy surface of the sample material. Then, the resultant sample was immersed in a suspension solution of 5% fluoride-based flux, followed by drying at 200° C., and subjected to a Nocolock brazing process at 600° C. for 3 min. A fin bonding rate was defined as a rate of the number of the joined waves to the number of the whole waves. A test core having a fin bonding rate of at least 95% was estimated as being acceptable and designated to as "◯". A test core having a fin bonding rate of less than 95% was estimated as being unacceptable and designated to as "×".

(5) Erosion Resistance:

A test was produced in the same manner as above, Sectional microobservation was conducted, and whether any erosion was occurred or not was confirmed. A test core without erosion was estimated as being acceptable and designated to as "◯". A test core on which erosion was observed was estimated as being unacceptable and designated to as "×".

(6) External Corrosion Resistance:

A test core was produced in the same manner as above, and a sacrificial anode material side of the test core was sealed. The resultant sealed test core was subjected to a CASS test (JIS H8681) for 500 hours, to measure a maximum pitting depth. When the maximum deepest was less than 0.15 μm, the test core concerned was estimated as being acceptable. When the maximum deepest was equal to or more than 0.15 μm, the test core was estimated as being unacceptable.

(7) Internal Corrosion Resistance:

After heat-brazing at 600° C. for 3 min in the same manner as for the tensile test sample, a filler alloy side of the sample was sealed. A cycle immersion test in hot water containing 500 ppm of Cl⁻, 100 ppm of $SO_4^{2-}$ and 10 ppm of $Cu^{2+}$ at 88° C. for hours and at room temperature for 16 hours, was conducted for 3 months, to measure the maximum pitting depth. When the maximum deepest was less than 0.15 μm, the test core concerned was estimated as being acceptable. When the maximum deepest was equal to or more than 0.15 μm, the test core was estimated as being unacceptable.

TABLE 1

| Alloy | Alloy Reference | Alloy Compositions (mass %) | | | | | | | | | |
|---|---|---|---|---|---|---|---|---|---|---|---|
| | | Si | Fe | Cu | Mn | Mg | Zn | Ti | Zr | Cr | V | Al |
| Alloy for Core Alloy (Example) | A1 | 1.0 | 0.15 | 0.5 | 1.1 | 0.2 | — | 0.15 | 0.15 | — | — | Balance |
| | A2 | 0.5 | 0.15 | 0.7 | 1.1 | 0.3 | — | — | — | 0.15 | — | Balance |
| | A3 | 0.7 | 0.2 | 0.7 | 1.1 | 0.4 | — | — | — | — | 0.15 | Balance |
| | A4 | 0.5 | 0.15 | 0.5 | 0.5 | 0.5 | — | 0.15 | — | 0.15 | — | Balance |
| | A5 | 0.7 | 0.15 | 0.5 | 1.1 | 0.6 | — | 0.15 | — | — | 0.15 | Balance |
| Alloy for Core Alloy (Comparative Example) | A6 | 1.5 | 0.5 | 0.2 | 1.1 | — | — | 0.15 | 0.4 | — | — | Balance |
| | A7 | 0.5 | 0.15 | 1.2 | 2.2 | 0.2 | — | 0.4 | — | — | — | Balance |
| | A8 | 0.5 | 0.15 | 0.5 | 1.1 | 0.8 | — | — | — | — | — | Balance |

TABLE 2

| Alloy | Alloy Reference | Alloy Compositions (mass %) | | | | | | | | | |
|---|---|---|---|---|---|---|---|---|---|---|---|
| | | Si | Fe | Cu | Mn | Mg | Zn | Ti | Zr | Cr | V | Al |
| Alloy for Sacrificial Alloy (Example) | B1 | 0.5 | 0.15 | — | 1.1 | — | 3.0 | 0.15 | — | — | — | Balance |
| | B2 | 0.8 | 0.15 | — | — | — | 4.0 | — | — | — | 0.15 | Balance |
| | B3 | — | 0.15 | — | 0.5 | — | 5.0 | — | — | — | — | Balance |

TABLE 3

| | | | Hot Rolling Condition | | |
|---|---|---|---|---|---|
| | Alloy Reference | | Beginning | Ending | |
| Test Material No. | Core Alloy | Sacrificial Alloy | Temperature (° C.) | Temperature (° C.) | Annealing Condition |
| Example 1 | A1 | B1 | 460 | 260 | 370° C. × 2 h |
| Example 2 | A2 | B1 | 460 | 260 | 370° C. × 2 h |
| Example 3 | A3 | B1 | 460 | 260 | 370° C. × 2 h |
| Example 4 | A4 | B1 | 460 | 260 | 370° C. × 2 h |
| Example 5 | A5 | B1 | 460 | 260 | 370° C. × 2 h |
| Example 6 | A1 | B2 | 460 | 260 | 370° C. × 2 h |
| Example 7 | A1 | B3 | 460 | 260 | 370° C. × 2 h |
| Comparative Example 8 | A6 | B1 | 460 | 260 | 370° C. × 2 h |
| Comparative Example 9 | A7 | B1 | 460 | 260 | 370° C. × 2 h |
| Comparative Example 10 | A8 | B1 | 460 | 260 | 370° C. × 2 h |

TABLE 3-continued

|  | Alloy Reference | | Hot Rolling Condition | | |
|---|---|---|---|---|---|
|  | Core | Sacrificial | Beginning Temperature | Ending Temperature | Annealing |
| Test Material No. | Alloy | Alloy | (° C.) | (° C.) | Condition |
| Example 13 | A1 | B1 | 450 | 280 | 370° C. × 2 h |
| Example 14 | A1 | B1 | 480 | 250 | 370° C. × 2 h |
| Example 15 | A1 | B1 | 450 | 250 | 370° C. × 2 h |
| Example 16 | A1 | B1 | 460 | 260 | 320° C. × 2 h |
| Example 17 | A1 | B1 | 460 | 260 | 300° C. × 2 h |
| Example 18 | A1 | B1 | 460 | 260 | 280° C. × 2 h |
| Comparative Example 19 | A1 | B1 | 550 | 290 | 370° C. × 2 h |
| Comparative Example 20 | A1 | B1 | 500 | 320 | 370° C. × 2 h |
| Comparative Example 21 | A1 | B1 | 550 | 320 | 370° C. × 2 h |

TABLE 4

| Test Material No. | Density of Intermetallic Compound ($n/\mu m^2$) | Crystallized Grain Diameter ($\mu m$) | Tensile Strength ($N/mm^2$) | Fin Bonding Rate | Erosion Registance | Maximum Pitting Depth ($\mu m$) | |
|---|---|---|---|---|---|---|---|
|  |  |  |  |  |  | External | Internal |
| Example 1 | 7 | 170 | 185 | ○ | ○ | 0.08 | 0.07 |
| Example 2 | 5 | — | 210 | ○ | ○ | 0.08 | 0.08 |
| Example 3 | 5 | 180 | 220 | ○ | ○ | 0.10 | 0.10 |
| Example 4 | 3 | — | 225 | ○ | ○ | 0.07 | 0.07 |
| Example 5 | 5 | — | 235 | ○ | ○ | 0.08 | 0.08 |
| Example 6 | 7 | 170 | 190 | ○ | ○ | 0.08 | 0.06 |
| Example 7 | 7 | 170 | 185 | ○ | ○ | 0.08 | 0.07 |
| Comparative Example 8 | 12 | 90 | 155 | X | X | Through | 0.09 |
| Comparative Example 9 | 12 | 130 | 175 | ○ | X | 0.12 | 0.10 |
| Comparative Example 10 | 4 | 160 | 240 | X | ○ | 0.10 | 0.07 |
| Example 13 | 7 | — | 190 | ○ | ○ | 0.08 | 0.08 |
| Example 14 | 7 | — | 180 | ○ | ○ | 0.09 | 0.07 |
| Example 15 | 7 | — | 190 | ○ | ○ | 0.08 | 0.08 |
| Example 16 | 6 | — | 195 | ○ | ○ | 0.07 | 0.08 |
| Example 17 | 5 | — | 200 | ○ | ○ | 0.08 | 0.08 |
| Example 18 | 5 | — | 195 | ○ | ○ | 0.08 | 0.07 |
| Comparative Example 19 | 13 | — | 175 | ○ | ○ | 0.08 | 0.08 |
| Comparative Example 20 | 12 | — | 175 | ○ | ○ | 0.08 | 0.08 |
| Comparative Example 21 | 13 | — | 170 | ○ | ○ | 0.07 | 0.07 |

As is apparent from Table 4, the test material Nos. 1-7 and 13-18, as examples according to the present invention, each had a sufficiently high tensile strength after brazing of 180 N/mm$^2$ or higher, was excellent in brazing properties, such as the fin bonding rate and erosion resistance, and was good in both the external (corresponding an atmospheric side of a heat exchanger) and internal (corresponding a refrigerant side) corrosion resistance. In the test material Nos. 1-7 and 13-18, the density of the intermetallic compounds having a grain diameter of at least 0.1 μm after brazing, was at most 10/μm$^2$. In the test material Nos. 1, 3, 6 and 7, the crystallized grain diameter of the core alloy after brazing is at least 100 μm.

In the test material Nos. 16-18 in which the annealing condition was further regulated in comparison with that of the test material No. 1 having the same compositions as the test material Nos. 16-18, the density of the intermetallic compounds becomes smaller than that of the test material No. 1, and the strength after brazing were more improved than that of test material No. 1.

On the other hand, each of the test material Nos. 8, 9 and 19-21 as Comparative Examples had the strength of less than 180 N/mm$^2$ after brazing, and thus inferior to that of Examples. Also, in each of the test material Nos. 8, 9 and 10, the brazing properties degraded due to the decline of the fin bonding rates or the occurrence of the erosion. In the test material No. 8, either of the internal or external corrosion through hole occurs. Further, in each of the test material Nos. 8 and 9, coarse intermetallic compounds were formed in the core alloy or the sacrificial anode material upon casting. In each of the test material Nos. 8, 9 and 19-21, the density of the intermetallic compounds having a grain diameter of at least 0.1 μm after brazing, was more than 10/μm$^2$. Also, in the test material No. 8, the crystallized grain diameter in the core alloy after brazing was less than 100 μm.

2. Examples 17/1-17/8

Corresponding to the Test Materials 17/1-17/8, Respectively

Test materials No. 17/1 as Example of the present invention corresponding to the test material No. 17 was subjected to the homogenization treatment of 600° C. for 3 hours prior to hot rolling. Also, the test material No. 17/2 as Example of the present invention corresponding to the test material No. 17 was subjected to the homogenization treatment of 500° C. for 3 hours prior to hot rolling. Further, the test material No. 17/3 as Example of the present invention corresponding to the test material No. 17/1 was subjected to final annealing of 370° C. for 2 hours as a substitute for final annealing of 300° C. for 2 hours, to which the test material No. 17/1 was subjected. Furthermore, the test material No. 17/4 as Example of the present invention corresponding to the test material No. 17/2 was subjected to final annealing of 370° C. for 2 hours as a substitute for final annealing of 300° C.×2 hours, to which the test material No. 17/2 was subjected. The test material No. 17/5 as Example of the present invention corresponding to the test material No. 17/1 was subjected to the homogenization treatment of 550° C.×3 hours prior to hot rolling as a substitute for the homogenization treatment of 600° C. for 3 hours, to which the test material No. 17/1 was subjected. Also, the test material 17/6 as Example of the present invention corresponding to the test material No. 17/3 was subjected to the homogenization treatment of 550° C. for 3 hours prior to hot rolling as a substitute for the homogenization treatment of 600° C. for 3 hours, to which the test material No. 17/3 was subjected. Further, the test material No. 17/7 as Example of the present invention corresponding to the test material No. 17/1 was subjected to the homogenization treatment of 620° C. for 3 hours prior to hot rolling as a substitute for the homogenization treatment of 600° C. for 3 hours, to which the test material No. 17/1 was subjected. Furthermore, the test material No. 17/8 as Example of the present invention corresponding to the test material No. 17/3 was subjected to the homogenization treatment of 620° C. for 3 hours prior to hot rolling as a substitute for the homogenization treatment of 600° C. for 3 hours, to which the test material No. 17/3 was subjected.

The alloy reference and treatment condition for the test material Nos. 17-1-17-8 are shown in Table 5. The density of intermetallic compounds after brazing, strength after brazing and brazing properties for these test materials were measured by as same manner as conducted in the test material No. 1. The results are shown in Table 6.

As is apparent from Table 6, the test material Nos. 17-1-17-8, as examples according to the present invention, each had a sufficiently high tensile strength after brazing of 180 N/mm$^2$ or higher, was excellent in brazing properties, such as the fin bonding rate and erosion resistance, and was good in both the external (corresponding an atmospheric side of a heat exchanger) and internal (corresponding a refrigerant side) corrosion resistance. Also, in these test materials, the density of the intermetallic compounds having a grain diameter of at least 0.1 μm after brazing, was at most 10/μm$^2$.

3. Examples 22-26, 28, 29 and 29/1-29/5, and Comparative Examples 27, 30

Corresponding to the Test Material Nos. 22-26, 28, 29, 29/1-29/5, 27 and 30, Respectively A test material No. 22 was corresponding to the test material 1 from which the sacrificial anode material was eliminated. A test material No. 23 was corresponding to the test material No. 1 in which the sacrificial anode material was replaced with a filler alloy composed of JIS 4045. A test material No. 24 corresponding to the test material No. 1 was subjected to the homogenization treatment of 500° C. for 3 hours prior to hot rolling. As shown in Table 7, each of test material Nos. 25, 26, 27, 28, 29 and 30 were corresponding to the test material No. 1 in which hot rolling condition was different from that for the test material No. 1. Also, as shown

TABLE 5

| Test Material No. | Alloy Reference | | Homogenization Treatment Condition | Hot Rolling Condition | | Final Annealing Condition |
|---|---|---|---|---|---|---|
| | Core Alloy | Sacrificial Alloy | | Beginning Temperature | Ending Temperature | |
| Example 17/1 | A1 | B1 | 600° C. × 3 h | 460° C. | 260° C. | 300° C. × 2 h |
| Example 17/2 | A1 | B1 | 500° C. × 3 h | 460° C. | 260° C. | 300° C. × 2 h |
| Example 17/3 | A1 | B1 | 600° C. × 3 h | 460° C. | 260° C. | 370° C. × 2 h |
| Example 17/4 | A1 | B1 | 500° C. × 3 h | 460° C. | 260° C. | 370° C. × 2 h |
| Example 17/5 | A1 | B1 | 550° C. × 3 h | 460° C. | 260° C. | 300° C. × 2 h |
| Example 17/6 | A1 | B1 | 550° C. × 3 h | 460° C. | 260° C. | 370° C. × 2 h |
| Example 17/7 | A1 | B1 | 620° C. × 3 h | 460° C. | 260° C. | 300° C. × 2 h |
| Example 17/8 | A1 | B1 | 620° C. × 3 h | 460° C. | 260° C. | 370° C. × 2 h |

TABLE 6

| Test Material No. | Density of Intermetallic Compound (n/μm$^2$) | Tensile Strength (N/mm$^2$) | Fin Bonding Rate | Erosion Resistance | Maximum Pitting Depth (μm) | |
|---|---|---|---|---|---|---|
| | | | | | External | Internal |
| Example 17/1 | 3 | 195 | ○ | ○ | 0.07 | 0.07 |
| Example 17/2 | 8 | 185 | ○ | ○ | 0.08 | 0.08 |
| Example 17/3 | 4 | 190 | ○ | ○ | 0.08 | 0.09 |
| Example 17/4 | 9 | 180 | ○ | ○ | 0.07 | 0.08 |
| Example 17/5 | 5 | 190 | ○ | ○ | 0.07 | 0.07 |
| Example 17/6 | 7 | 185 | ○ | ○ | 0.08 | 0.08 |
| Example 17/7 | 3 | 195 | ○ | ○ | 0.07 | 0.08 |
| Example 17/8 | 4 | 190 | ○ | ○ | 0.07 | 0.07 | in Table 7, each of test material Nos. 29/1-29/5 were corresponding to the test material No. 1 in which hot rolling condition and annealing condition were different from that for the test material No. 1.

TABLE 7

| Test Material No. | Hot Rolling Condition | | Annealing Condition |
|---|---|---|---|
| | Beginning Temperature (° C.) | Ending Temperature (° C.) | |
| Example 25 | 440 | 260 | 370° C. × 2 h |
| Example 26 | 400 | 260 | 370° C. × 2 h |
| Comparative Example 27 | 360 | 260 | 370° C. × 2 h |
| Example2 8 | 460 | 240 | 370° C. × 2 h |
| Example 29 | 460 | 210 | 370° C. × 2 h |
| Example 29/1 | 460 | 280 | 370° C. × 2 h |
| Example 29/2 | 460 | 260 | 250° C. × 2 h |
| Example 29/3 | 460 | 260 | 330° C. × 2 h |
| Example 29/4 | 480 | 280 | 370° C. × 2 h |
| Example 29/5 | 480 | 260 | 370° C. × 2 h |
| Comparative Example 30 | 460 | 180 | 370° C. × 2 h |

The density of intermetallic compounds after brazing, the crystallized grain diameter after brazing, strength after brazing and brazing properties for these test materials were measured by as same manner as conducted in the test material Nos. 1-7. The results are shown in Table 8.

TABLE 8

| Test Material No. | Density of Intermetallic Compound (n/μm²) | Crystallized Grain Diameter (μm) | Tensile Strength (N/mm²) | Fin Bonding Rate | Erosion Resistance | Maximum Pitting Depth (μm) | |
|---|---|---|---|---|---|---|---|
| | | | | | | External | Internal |
| Example 22 | 7 | 170 | 195 | ○ | ○ | 0.08 | *1)— |
| Example 23 | 7 | 170 | 205 | ○ | ○ | 0.08 | *1)— |
| Example 24 | 9 | 170 | 180 | ○ | ○ | 0.07 | 0.07 |
| Example 25 | 6 | 180 | 190 | ○ | ○ | 0.08 | 0.08 |
| Example 26 | 4 | 190 | 200 | ○ | ○ | 0.08 | 0.07 |
| Comparative Example 27 | | | | *2 | | | |
| Example 28 | 6 | 190 | 190 | ○ | ○ | 0.09 | 0.07 |
| Example 29 | 5 | 190 | 195 | ○ | ○ | 0.08 | 0.07 |
| Example 29/1 | 8 | 170 | 185 | ○ | ○ | 0.08 | 0.07 |
| Example 29/2 | 5 | 130 | 195 | ○ | ○ | 0.09 | 0.09 |
| Example 29/3 | 7 | 150 | 190 | ○ | ○ | 0.08 | 0.08 |
| Example 29/4 | 9 | 160 | 180 | ○ | ○ | 0.07 | 0.08 |
| Example 29/5 | 9 | 160 | 180 | ○ | ○ | 0.08 | 0.08 |
| Comparative Example 30 | | | | *3 | | | |

*1) Each of the test material Nos. 22 and 23 has no sacrifice material on an inner surface of the core alloy, and thus is unsuitable in use under an environment in which the inner surface of the core alloy is subjected to corrosion. Accordingly, an estimation was not carried out regarding the internal corrosion resistance of the core alloy.
*2) The test material No. 27 could not be appropriately obtained due to insufficient press-adhesion of the sacrifice anode material and the filler alloy to the core alloy.
*3) Ther text material No. 30 could not be appropriately obtained due to the cutting of the test material during cold rolling.

As is apparent from Table 8, the test material Nos. 22-26, 28, 29, 29/1-29/5, as examples according to the present invention, each had a sufficiently high tensile strength after brazing of 180 N/mm² or higher, was excellent in brazing properties, such as the fin bonding rate and erosion resistance, and was good in both the external (corresponding an atmospheric side of a heat exchanger) and internal (corresponding a refrigerant side) corrosion resistance. In these test materials, the density of the intermetallic compounds having a grain diameter of at least 0.1 μm after brazing, was at most 10/μm². Also, in these test material, the crystallized grain diameter in the core alloy after brazing was at least 100 μm.

On the other hand, in the test material No. 27, the clad materials could not be press-adhered to the core alloy upon hot rolling due to the fact that the beginning temperature of hot rolling was too low, and thus it was not possible to appropriately obtain a test sample of the test material No. 27 itself. Also, in test material No. 30, a large amount of strain was accumulated in the sample due to the fact that the ending temperature of hot rolling was too low. As a result, many cracks occurred in the test material upon cold rolling, and thus it was not possible to appropriately obtain a test sample of the test material No. 30 itself.

4. Examples 31-69, 80-101, and Comparative Examples 70-79

Corresponding to the Test Material Nos. 31-69, 80-101 and 70-79, Respectively

In accordance with as same manner conducted in the test material Nos. 1-21, the test material Nos. 31-101 were prepared using alloy for a core alloy and sacrificial anode material, having the metal components and composition as shown in Tables 9 and 10. A 4045 alloy was used as a filler alloy.

These alloy materials were combined as shown Table 11 and clad ratios of the filler alloy and the sacrificial anode material were set to 15%. The resultant combination of materials was pressure bonded under hot rolling condition shown in Table 11, to thereby obtain a three-layer clad material having a thickness of 3.5 mm. Then, the resultant was processed under the step including annealing having the condition shown in Table 11 and made to a sheet having a thickness of 0.25 mm. Then, the resultant was cold rolled after hot rolling, then was intermediately annealed under the condition shown in Table 11, was further finally cold rolled, to thereby obtain the resultant test material having a final thickness of 0.25 mm.

TABLE 9

| | Alloy Reference | Alloy Compositions (mass %) | | | | | | | | | |
|---|---|---|---|---|---|---|---|---|---|---|---|
| | | Si | Fe | Cu | Mn | Mg | Zn | Ti | Zr | Cr | V | Al |
| Alloy for Core Alloy (Example) | A9 | 1.2 | 0.15 | 0.5 | 1.1 | 0.2 | — | 0.15 | 0.15 | — | — | Balance |
| | A10 | 0.3 | 0.15 | 0.7 | 1.1 | 0.2 | — | 0.15 | 0.15 | — | — | Balance |
| | A11 | 0.6 | 0.15 | 0.7 | 1.1 | 0.2 | — | 0.15 | 0.15 | — | — | Balance |
| | A12 | 0.9 | 0.15 | 0.7 | 1.1 | 0.2 | — | 0.15 | 0.15 | — | — | Balance |
| | A13 | 1.0 | 0.4 | 0.5 | 1.1 | 0.2 | — | 0.15 | 0.15 | — | — | Balance |
| | A14 | 1.0 | 0.05 | 0.5 | 1.1 | 0.2 | — | 0.15 | 0.15 | — | — | Balance |
| | A15 | 1.0 | 0.1 | 0.5 | 1.1 | 0.2 | — | 0.15 | 0.15 | — | — | Balance |
| | A16 | 1.0 | 0.3 | 0.5 | 1.1 | 0.2 | — | 0.15 | 0.15 | — | — | Balance |
| | A17 | 1.0 | 0.15 | 1.2 | 1.1 | 0.2 | — | 0.15 | 0.15 | — | — | Balance |
| | A18 | 1.0 | 0.15 | 0.3 | 1.1 | 0.2 | — | 0.15 | 0.15 | — | — | Balance |
| | A19 | 1.0 | 0.15 | 0.9 | 1.1 | 0.2 | — | 0.15 | 0.15 | — | — | Balance |
| | A20 | 1.0 | 0.15 | 1.0 | 1.1 | 0.2 | — | 0.15 | 0.15 | — | — | Balance |
| | A21 | 1.0 | 0.15 | 0.5 | 1.8 | 0.2 | — | 0.15 | 0.15 | — | — | Balance |
| | A22 | 1.0 | 0.15 | 0.5 | 0.3 | 0.2 | — | 0.15 | 0.15 | — | — | Balance |
| | A23 | 1.0 | 0.15 | 0.5 | 1.0 | 0.2 | — | 0.15 | 0.15 | — | — | Balance |
| | A24 | 1.0 | 0.15 | 0.5 | 1.5 | 0.2 | — | 0.15 | 0.15 | — | — | Balance |
| | A25 | 1.0 | 0.15 | 0.5 | 1.6 | 0.2 | — | 0.15 | 0.15 | — | — | Balance |
| | A26 | 1.0 | 0.15 | 0.9 | 1.1 | 0.05 | — | 0.15 | 0.15 | — | — | Balance |
| | A27 | 1.0 | 0.15 | 0.9 | 1.1 | 0.1 | — | 0.15 | 0.15 | — | — | Balance |
| | A28 | 1.0 | 0.15 | 0.9 | 1.1 | 0.15 | — | 0.15 | 0.15 | — | — | Balance |
| | A29 | 1.0 | 0.15 | 0.5 | 1.1 | 0.2 | — | 0.3 | 0.15 | — | — | Balance |
| | A30 | 1.0 | 0.15 | 0.5 | 1.1 | 0.2 | — | 0.02 | 0.15 | — | — | Balance |
| | A31 | 1.0 | 0.15 | 0.5 | 1.1 | 0.2 | — | 0.1 | 0.15 | — | — | Balance |
| | A32 | 1.0 | 0.15 | 0.5 | 1.1 | 0.2 | — | 0.05 | 0.15 | — | — | Balance |
| | A33 | 1.0 | 0.15 | 0.5 | 1.1 | 0.2 | — | 0.2 | 0.15 | — | — | Balance |
| | A34 | 1.0 | 0.15 | 0.5 | 1.1 | 0.2 | — | 0.15 | 0.3 | — | — | Balance |
| | A35 | 1.0 | 0.15 | 0.5 | 1.1 | 0.2 | — | 0.15 | 0.02 | — | — | Balance |
| | A36 | 1.0 | 0.15 | 0.5 | 1.1 | 0.2 | — | 0.15 | 0.1 | — | — | Balance |
| | A37 | 1.0 | 0.15 | 0.5 | 1.1 | 0.2 | — | 0.15 | 0.05 | — | — | Balance |
| | A38 | 1.0 | 0.15 | 0.5 | 1.1 | 0.2 | — | 0.15 | 0.2 | — | — | Balance |
| | A39 | 0.5 | 0.15 | 0.7 | 1.1 | 0.3 | — | — | — | 0.3 | — | Balance |
| | A40 | 0.5 | 0.15 | 0.7 | 1.1 | 0.3 | — | — | — | 0.02 | — | Balance |
| | A41 | 0.5 | 0.15 | 0.7 | 1.1 | 0.3 | — | — | — | 0.1 | — | Balance |
| | A42 | 0.5 | 0.15 | 0.7 | 1.1 | 0.3 | — | — | — | 0.2 | — | Balance |
| | A43 | 0.7 | 0.2 | 0.7 | 1.1 | 0.4 | — | — | — | — | 0.3 | Balance |
| | A44 | 0.7 | 0.2 | 0.7 | 1.1 | 0.4 | — | — | — | — | 0.02 | Balance |
| | A45 | 0.7 | 0.2 | 0.7 | 1.1 | 0.4 | — | — | — | — | 0.2 | Balance |
| | A46 | 0.7 | 0.2 | 0.7 | 1.1 | 0.4 | — | — | — | — | 0.1 | Balance |
| | A47 | 0.7 | 0.2 | 0.7 | 1.1 | 0.4 | — | — | — | — | 0.05 | Balance |
| Alloy for Core Alloy (Comparative Example) | A48 | 0.1 | 0.15 | 0.5 | 1.1 | 0.2 | — | 0.15 | 0.15 | — | — | Balance |
| | A49 | 1.0 | 0.01 | 0.5 | 1.1 | 0.2 | — | 0.15 | 0.15 | — | — | Balance |
| | A50 | 1.0 | 0.15 | 1.5 | 1.1 | 0.2 | — | 0.15 | 0.15 | — | — | Balance |
| | A51 | 1.0 | 0.15 | 0.5 | 0.1 | 0.2 | — | 0.15 | 0.15 | — | — | Balance |
| | A52 | 1.0 | 0.15 | 0.5 | 1.1 | 0.01 | — | 0.15 | 0.15 | — | — | Balance |
| | A53 | 1.0 | 0.15 | 0.5 | 1.1 | 0.2 | — | 0.01 | — | — | — | Balance |
| | A54 | 1.0 | 0.15 | 0.5 | 1.1 | 0.2 | — | — | 0.01 | — | — | Balance |
| | A55 | 0.5 | 0.15 | 0.7 | 1.1 | 0.2 | — | — | — | 0.01 | — | Balance |
| | A56 | 0.5 | 0.15 | 0.7 | 1.1 | 0.2 | — | — | — | 0.4 | — | Balance |
| | A57 | 0.5 | 0.2 | 0.7 | 1.1 | 0.2 | — | — | — | — | 0.01 | Balance |
| | A58 | 0.5 | 0.2 | 0.7 | 1.1 | 0.2 | — | — | — | — | 0.4 | Balance |

TABLE 10

| | Alloy Reference | Alloy Compositions (mass %) | | | | | | | | | |
|---|---|---|---|---|---|---|---|---|---|---|---|
| | | Si | Fe | Cu | Mn | Mg | Zn | Ti | Zr | Cr | V | Al |
| Alloy for Sacrificial Alloy (Example) | B6 | 0.5 | 0.15 | — | 1.1 | — | 2.0 | 0.15 | — | — | — | Balance |
| | B6-1 | 0.5 | 0.15 | — | 1.1 | — | 6.0 | 0.15 | — | — | — | Balance |
| | B7 | — | 0.15 | — | 1.8 | — | 5.0 | — | — | — | — | Balance |
| | B8 | 0.5 | 0.15 | — | 0.05 | — | 5.0 | 0.15 | — | — | — | Balance |
| | B9 | 0.5 | 0.15 | — | 0.1 | — | 5.0 | 0.15 | — | — | — | Balance |
| | B10 | 0.5 | 0.15 | — | 1.6 | — | 5.0 | 0.15 | — | — | — | Balance |
| | B11 | 0.5 | 0.15 | — | 1 | — | 5.0 | 0.15 | — | — | — | Balance |
| | B12 | 0.5 | 0.15 | — | 1.1 | — | 3.0 | 0.3 | — | — | — | Balance |
| | B13 | 0.5 | 0.15 | — | 1.1 | — | 3.0 | 0.02 | — | — | — | Balance |
| | B14 | 0.5 | 0.15 | — | 1.1 | — | 3.0 | 0.1 | — | — | — | Balance |
| | B15 | 0.5 | 0.15 | — | 1.1 | — | 3.0 | 0.05 | — | — | — | Balance |
| | B16 | 0.5 | 0.15 | — | 1.1 | — | 3.0 | 0.2 | — | — | — | Balance |
| | B17 | 0.8 | 0.15 | — | — | — | 4.0 | — | — | — | 0.3 | Balance |
| | B18 | 0.8 | 0.15 | — | — | — | 4.0 | — | — | — | 0.02 | Balance |
| | B19 | 0.8 | 0.15 | — | — | — | 4.0 | — | — | — | 0.1 | Balance |
| | B20 | 0.8 | 0.15 | — | — | — | 4.0 | — | — | — | 0.05 | Balance |

TABLE 10-continued

| Alloy Reference | Alloy Compositions (mass %) | | | | | | | | | | |
|---|---|---|---|---|---|---|---|---|---|---|---|
| | Si | Fe | Cu | Mn | Mg | Zn | Ti | Zr | Cr | V | Al |
| B21 | 0.8 | 0.15 | — | — | — | 4.0 | — | — | — | 0.2 | Balance |
| B22 | 0.05 | 0.15 | — | — | — | 4.0 | — | — | — | — | Balance |
| B23 | 0.1 | 0.15 | — | — | — | 4.0 | — | — | — | — | Balance |
| B24 | 1 | 0.15 | — | — | — | 4.0 | — | — | — | — | Balance |
| B25 | 0.8 | 0.05 | — | — | — | 4.0 | — | — | — | — | Balance |
| B26 | 0.8 | 0.2 | — | — | — | 4.0 | — | — | — | — | Balance |

TABLE 11

| Test Material No. | Alloy Reference | | Hot Rolling Condition | | Annealing Condition |
|---|---|---|---|---|---|
| | Core Alloy | Sacrificial Alloy | Beginning Temperature (° C.) | Ending Temperature (° C.) | |
| Example 31 | A9 | B25 | 460 | 260 | 370° C. × 2 h |
| Example 32 | A10 | B25 | 460 | 260 | 370° C. × 2 h |
| Example 33 | A11 | B25 | 460 | 260 | 370° C. × 2 h |
| Example 34 | A12 | B25 | 460 | 260 | 370° C. × 2 h |
| Example 35 | A13 | B25 | 460 | 260 | 370° C. × 2 h |
| Example 36 | A14 | B25 | 460 | 260 | 370° C. × 2 h |
| Example 37 | A15 | B25 | 460 | 260 | 370° C. × 2 h |
| Example 38 | A16 | B25 | 460 | 260 | 370° C. × 2 h |
| Example 39 | A17 | B25 | 460 | 260 | 370° C. × 2 h |
| Example 40 | A18 | B25 | 460 | 260 | 370° C. × 2 h |
| Example 41 | A19 | B25 | 460 | 260 | 370° C. × 2 h |
| Example 42 | A20 | B25 | 460 | 260 | 370° C. × 2 h |
| Example 43 | A21 | B25 | 460 | 260 | 370° C. × 2 h |
| Example 44 | A22 | B25 | 460 | 260 | 370° C. × 2 h |
| Example 45 | A23 | B25 | 460 | 260 | 370° C. × 2 h |
| Example 46 | A24 | B25 | 460 | 260 | 370° C. × 2 h |
| Example 47 | A25 | B25 | 460 | 260 | 370° C. × 2 h |
| Example 48 | A26 | B25 | 460 | 260 | 370° C. × 2 h |
| Example 49 | A27 | B25 | 460 | 260 | 370° C. × 2 h |
| Example 50 | A28 | B25 | 460 | 260 | 370° C. × 2 h |
| Example 51 | A29 | B25 | 460 | 260 | 370° C. × 2 h |
| Example 52 | A30 | B25 | 460 | 260 | 370° C. × 2 h |
| Example 53 | A31 | B25 | 460 | 260 | 370° C. × 2 h |
| Example 54 | A32 | B25 | 460 | 260 | 370° C. × 2 h |
| Example 55 | A33 | B25 | 460 | 260 | 370° C. × 2 h |
| Example 56 | A34 | B25 | 460 | 260 | 370° C. × 2 h |
| Example 57 | A35 | B25 | 460 | 260 | 370° C. × 2 h |
| Example 58 | A36 | B25 | 460 | 260 | 370° C. × 2 h |
| Example 59 | A37 | B25 | 460 | 260 | 370° C. × 2 h |
| Example 60 | A38 | B25 | 460 | 260 | 370° C. × 2 h |
| Example 61 | A39 | B25 | 460 | 260 | 370° C. × 2 h |
| Example 62 | A40 | B25 | 460 | 260 | 370° C. × 2 h |
| Example 63 | A41 | B25 | 460 | 260 | 370° C. × 2 h |
| Example 64 | A42 | B25 | 460 | 260 | 370° C. × 2 h |
| Example 65 | A43 | B25 | 460 | 260 | 370° C. × 2 h |
| Example 66 | A44 | B25 | 460 | 260 | 370° C. × 2 h |
| Example 67 | A45 | B25 | 460 | 260 | 370° C. × 2 h |
| Example 68 | A46 | B25 | 460 | 260 | 370° C. × 2 h |
| Example 69 | A47 | B25 | 460 | 260 | 370° C. × 2 h |
| Comparative Example 70 | A48 | B25 | 460 | 260 | 370° C. × 2 h |
| Comparative Example 71 | A50 | B25 | 460 | 260 | 370° C. × 2 h |
| Comparative Example 72 | A51 | B25 | 460 | 260 | 370° C. × 2 h |
| Comparative Example 73 | A52 | B25 | 460 | 260 | 370° C. × 2 h |
| Comparative Example 74 | A53 | B25 | 460 | 260 | 370° C. × 2 h |
| Comparative Example 75 | A54 | B25 | 460 | 260 | 370° C. × 2 h |
| Comparative Example 76 | A55 | B25 | 460 | 260 | 370° C. × 2 h |
| Comparative Example 77 | A56 | B25 | 460 | 260 | 370° C. × 2 h |
| Comparative Example 78 | A57 | B25 | 460 | 260 | 370° C. × 2 h |
| Comparative Example 79 | A58 | B25 | 460 | 260 | 370° C. × 2 h |
| Example 80 | A9 | B6 | 460 | 260 | 370° C. × 2 h |
| Example 81 | A9 | B6-1 | 460 | 260 | 370° C. × 2 h |
| Example 82 | A9 | B7 | 460 | 260 | 370° C. × 2 h |
| Example 83 | A9 | B8 | 460 | 260 | 370° C. × 2 h |
| Example 84 | A9 | B9 | 460 | 260 | 370° C. × 2 h |
| Example 85 | A9 | B10 | 460 | 260 | 370° C. × 2 h |
| Example 86 | A9 | B11 | 460 | 260 | 370° C. × 2 h |
| Example 87 | A9 | B12 | 460 | 260 | 370° C. × 2 h |
| Example 88 | A9 | B13 | 460 | 260 | 370° C. × 2 h |
| Example 89 | A9 | B14 | 460 | 260 | 370° C. × 2 h |

TABLE 11-continued

| Test Material No. | Alloy Reference | | Hot Rolling Condition | | Annealing Condition |
|---|---|---|---|---|---|
| | Core Alloy | Sacrificial Alloy | Beginning Temperature (° C.) | Ending Temperature (° C.) | |
| Example 90 | A9 | B15 | 460 | 260 | 370° C. × 2 h |
| Example 91 | A9 | B16 | 460 | 260 | 370° C. × 2 h |
| Example 92 | A9 | B17 | 460 | 260 | 370° C. × 2 h |
| Example 93 | A9 | B18 | 460 | 260 | 370° C. × 2 h |
| Example 94 | A9 | B19 | 460 | 260 | 370° C. × 2 h |
| Example 95 | A9 | B20 | 460 | 260 | 370° C. × 2 h |
| Example 96 | A9 | B21 | 460 | 260 | 370° C. × 2 h |
| Example 97 | A9 | B22 | 460 | 260 | 370° C. × 2 h |
| Example 98 | A9 | B23 | 460 | 260 | 370° C. × 2 h |
| Example 99 | A9 | B24 | 460 | 260 | 370° C. × 2 h |
| Example 100 | A9 | B25 | 460 | 260 | 370° C. × 2 h |
| Example 101 | A9 | B26 | 460 | 260 | 370° C. × 2 h |

Then, a part of the thus-prepared sheet material was used as a sample, and the sample was subjected to measurements for a density of intermetallic compounds after brazing, a crystallized grain diameter, strength after brazing and brazing properties by as same manner conducted in the test material Nos. 1-21. The results are shown in Table 12.

TABLE 12

| Test Material No. | Density of Intermetallic Compound (n/μm$^2$) | Crystallized Grain Diameter (μm) | Tensile Strength (N/mm$^2$) | Fin Bonding Rate | Erosion Registance | Maximum Pitting Depth (μm) | |
|---|---|---|---|---|---|---|---|
| | | | | | | External | Internal |
| Example 31 | 8 | 180 | 195 | ○ | ○ | 0.08 | 0.07 |
| Example 32 | 4 | 200 | 180 | ○ | ○ | 0.07 | 0.09 |
| Example 33 | 6 | 180 | 185 | ○ | ○ | 0.07 | 0.08 |
| Example 34 | 7 | 170 | 190 | ○ | ○ | 0.07 | 0.09 |
| Example 35 | 10 | 100 | 190 | ○ | ○ | 0.10 | 0.07 |
| Example 36 | 5 | 280 | 185 | ○ | ○ | 0.05 | 0.06 |
| Example 37 | 6 | 250 | 185 | ○ | ○ | 0.06 | 0.06 |
| Example 38 | 9 | 120 | 190 | ○ | ○ | 0.09 | 0.07 |
| Example 39 | 7 | 160 | 200 | ○ | ○ | 0.09 | 0.10 |
| Example 40 | 7 | 170 | 185 | ○ | ○ | 0.10 | 0.09 |
| Example 41 | 7 | 170 | 195 | ○ | ○ | 0.08 | 0.10 |
| Example 42 | 7 | 160 | 195 | ○ | ○ | 0.08 | 0.09 |
| Example 43 | 9 | 150 | 190 | ○ | ○ | 0.08 | 0.07 |
| Example 44 | 3 | 220 | 180 | ○ | ○ | 0.10 | 0.10 |
| Example 45 | 6 | 160 | 185 | ○ | ○ | 0.08 | 0.07 |
| Example 46 | 8 | 180 | 190 | ○ | ○ | 0.08 | 0.07 |
| Example 47 | 8 | 180 | 190 | ○ | ○ | 0.07 | 0.08 |
| Example 48 | 7 | 160 | 180 | ○ | ○ | 0.08 | 0.08 |
| Example 49 | 7 | 170 | 185 | ○ | ○ | 0.08 | 0.09 |
| Example 50 | 7 | 170 | 190 | ○ | ○ | 0.07 | 0.08 |
| Example 51 | 8 | 170 | 190 | ○ | ○ | 0.07 | 0.07 |
| Example 52 | 6 | 160 | 180 | ○ | ○ | 0.09 | 0.08 |
| Example 53 | 7 | 160 | 180 | ○ | ○ | 0.08 | 0.07 |
| Example 54 | 7 | 160 | 180 | ○ | ○ | 0.09 | 0.08 |
| Example 55 | 7 | 170 | 185 | ○ | ○ | 0.07 | 0.07 |
| Example 56 | 8 | 190 | 190 | ○ | ○ | 0.08 | 0.07 |
| Example 57 | 7 | 140 | 180 | ○ | ○ | 0.08 | 0.08 |
| Example 58 | 7 | 160 | 185 | ○ | ○ | 0.08 | 0.08 |
| Example 59 | 6 | 150 | 180 | ○ | ○ | 0.07 | 0.07 |
| Example 60 | 7 | 180 | 185 | ○ | ○ | 0.08 | 0.08 |
| Example 61 | 5 | 190 | 215 | ○ | ○ | 0.07 | 0.08 |
| Example 62 | 4 | 160 | 205 | ○ | ○ | 0.09 | 0.09 |
| Example 63 | 5 | 160 | 210 | ○ | ○ | 0.08 | 0.08 |
| Example 64 | 5 | 170 | 210 | ○ | ○ | 0.08 | 0.07 |
| Example 65 | 7 | 170 | 225 | ○ | ○ | 0.07 | 0.07 |
| Example 66 | 6 | 170 | 215 | ○ | ○ | 0.08 | 0.08 |
| Example 67 | 6 | 170 | 220 | ○ | ○ | 0.07 | 0.07 |
| Example 68 | 6 | 170 | 220 | ○ | ○ | 0.07 | 0.08 |
| Example 69 | 6 | 170 | 215 | ○ | ○ | 0.08 | 0.08 |
| Comparative Example 70 | 2 | 220 | 165 | ○ | ○ | 0.07 | 0.07 |
| Comparative Example 71 | 7 | 180 | 205 | ○ | ⋝ | 0.17 | 0.14 |
| Comparative Example 72 | 2 | 90 | 170 | ○ | ⋝ | 0.15 | 0.09 |
| Comparative Example 73 | 7 | 160 | 165 | ○ | ○ | 0.08 | 0.07 |
| Comparative Example 74 | 7 | 170 | 175 | ○ | ○ | 0.10 | 0.09 |
| Comparative Example 75 | 7 | 150 | 175 | ○ | ○ | 0.11 | 0.11 |
| Comparative Example 76 | 8 | 180 | 175 | ○ | ○ | 0.10 | 0.10 |
| Comparative Example 77 | 7 | 170 | 185 | ○ | ○ | Through | 0.10 |

TABLE 12-continued

| Test Material No. | Density of Intermetallic Compound (n/μm²) | Crystallized Grain Diameter (μm) | Tensile Strength (N/mm²) | Fin Bonding Rate | Erosion Registance | Maximum Pitting Depth (μm) External | Maximum Pitting Depth (μm) Internal |
|---|---|---|---|---|---|---|---|
| Comparative Example 78 | 7 | 170 | 175 | ○ | ○ | 0.09 | 0.08 |
| Comparative Example 79 | 7 | 170 | 185 | ○ | ○ | Through | 0.09 |
| Example 80 | 8 | 170 | 190 | ○ | ○ | 0.09 | 0.10 |
| Example 81 | 8 | 170 | 190 | ○ | ○ | 0.09 | 0.08 |
| Example 82 | 8 | 170 | 190 | ○ | ○ | 0.09 | 0.08 |
| Example 83 | 8 | 170 | 190 | ○ | ○ | 0.08 | 0.06 |
| Example 84 | 8 | 170 | 195 | ○ | ○ | 0.08 | 0.06 |
| Example 85 | 8 | 170 | 190 | ○ | ○ | 0.08 | 0.09 |
| Example 86 | 8 | 170 | 195 | ○ | ○ | 0.08 | 0.09 |
| Example 87 | 8 | 170 | 195 | ○ | ○ | 0.08 | 0.08 |
| Example 88 | 8 | 170 | 190 | ○ | ○ | 0.09 | 0.09 |
| Example 89 | 8 | 170 | 190 | ○ | ○ | 0.08 | 0.08 |
| Example 90 | 8 | 170 | 190 | ○ | ○ | 0.08 | 0.09 |
| Example 91 | 8 | 170 | 190 | ○ | ○ | 0.08 | 0.08 |
| Example 92 | 8 | 170 | 200 | ○ | ○ | 0.07 | 0.07 |
| Example 93 | 8 | 170 | 195 | ○ | ○ | 0.08 | 0.08 |
| Example 94 | 8 | 170 | 195 | ○ | ○ | 0.09 | 0.07 |
| Example 95 | 8 | 170 | 195 | ○ | ○ | 0.09 | 0.08 |
| Example 96 | 8 | 170 | 200 | ○ | ○ | 0.08 | 0.07 |
| Example 97 | 8 | 170 | 180 | ○ | ○ | 0.08 | 0.07 |
| Example 98 | 8 | 170 | 180 | ○ | ○ | 0.07 | 0.07 |
| Example 99 | 8 | 170 | 200 | ○ | ○ | 0.08 | 0.08 |
| Example 100 | 8 | 170 | 200 | ○ | ○ | 0.08 | 0.08 |
| Example 101 | 8 | 170 | 200 | ○ | ○ | 0.08 | 0.09 |

As is apparent from Table 12, the test material Nos. 31-69 and 80-101 as examples according to the present invention, each had a sufficiently high tensile strength after brazing of 180 N/mm² or higher, was excellent in brazing properties, such as the fin bonding rate and erosion resistance, and was good in both the external (corresponding an atmospheric side of a heat exchanger) and internal (corresponding a refrigerant side) corrosion resistance. In these test materials, the density of the intermetallic compounds having a grain diameter of at least 0.1 μm after brazing, was at most 10/μm². Also, in these test material, the crystallized grain diameter in the core alloy after brazing was at least 100 μm.

On the other hand, in each of the test materials Nos. 70-79 as Comparative Examples, the density of the intermetallic compounds having a grain diameter at least 0.1μ after brazing was at most 10/μm². However, in the test material No. 72, the crystallized grain diameter in the core alloys after brazing were less than 100 μm. Also, after the brazing process, each of the test material Nos. 70, 72-76 and 78 had the inferior strength of less than 180 N/mm². In each of the test material Nos. 70-79, the fin bonding rate was acceptable. Nevertheless, in each of test material Nos. 71 and 72, the brazing properties degraded due to the occurrence of erosions. Also, in each of the test material Nos. 77 and 79, the through holes by corrosion occurred in the external corrosion resistance test. Further, in each of the test material Nos. 77 and 79, coarse intermetallic compounds were formed in the core alloy or the sacrificial anode material upon casting.

What is claimed is:

1. An aluminum alloy brazing sheet having high strength comprising:
    a core alloy; an Al—Si-based filler alloy cladded on one side or both sides of the core alloy,
    wherein the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities; and
    wherein, after the aluminum alloy brazing sheet is subjected to brazing, the core alloy features a metallic structure in which a density of intermetallic compounds having a grain diameter of at least 0.1 μm is at most ten grains per μm².

2. The aluminum alloy brazing sheet having high strength as set forth in claim 1, wherein a crystallized grain diameter of the core alloy after brazing is at least 100 μm.

3. The aluminum alloy brazing sheet having high strength as set forth in claim 1, wherein the core alloy having the Al—Si-based filler alloy cladded on one side or both sides thereof is hot rolled prior to being subjected to brazing such that a beginning temperature of hot rolling ranges from 380 to 480° C., and such that a finishing temperature of hot rolling ranges from 200 to 280° C.

4. The aluminum alloy brazing sheet having high strength as set forth in claim 3, wherein the core alloy having the Al—Si-based filler alloy cladded on one side or both sides thereof is subjected to at least one annealing, after hot rolling, at a temperature range from 250 to 400° C. for at least one hour.

5. An aluminum alloy brazing sheet having high strength comprising:
    a core alloy; an Al—Si-based filler alloy cladded on one side of the core alloy; and a sacrificial anode material cladded on the other side of the core alloy,
    wherein the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities;
    wherein the sacrificial anode material consists essentially of an aluminum alloy containing 2.0-6.0% Zn, the balance Al and unavoidable impurities; and wherein, after the aluminum alloy brazing sheet is subjected to brazing, the core alloy features a metallic structure in which a density of intermetallic compounds having a grain diameter of at least 0.1 μm is at most ten grains per μm².

6. The aluminum alloy brazing sheet having high strength as set forth in claim 5, wherein a crystallized grain diameter of the core alloy after brazing is at least 100 μm.

7. An aluminum alloy brazing sheet having high strength comprising:
   a core alloy; an Al—Si-based filler alloy cladded on one side of the core alloy; and a sacrificial anode material cladded on the other side of the core alloy,
   wherein the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities;
   wherein the sacrificial anode material consists essentially of an aluminum alloy containing 2.0-6.0% Zn, and containing one or more elements selected from the group consisting of 0.05-1.0% Si, 0.05-1.8% Mn, 0.02-0.3% Ti and 0.02-0.3% V, the balance of Al and unavoidable impurities; and
   wherein, after the aluminum alloy brazing sheet is subjected to brazing, the core alloy features a metallic structure in which a density of intermetallic compounds having a grain diameter of at least 0.1 μm is at most ten grains per μm².

8. The aluminum alloy brazing sheet having high strength as set forth in claim 7, wherein a crystallized grain diameter of the core alloy after brazing is at least 100 μm.

9. A method for producing an aluminum alloy brazing sheet having high strength, which method comprises the steps of:
   preparing a core alloy having one side and the other side, the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities;
   cladding an Al—Si-based filler alloy on one side or both sides of the core alloy; and
   subjecting the resultant cladded alloy materials to hot rolling such that a beginning temperature of hot rolling ranges from 380 to 480° C., and such that a finishing temperature of hot rolling ranges from 200 to 280° C.,
   wherein, after the aluminum alloy brazing sheet is subjected to brazing, the core alloy features a metallic structure in which a density of intermetallic compounds having a grain diameter of at least 0.1 μm is at most ten grains per μm².

10. The method as set forth in claim 9, further comprising the step of subjecting the aluminum alloy brazing sheet to at least one annealing, after hot rolling, at a temperature range from 250 to 400° C. for at least one hour.

11. The method as set forth in claim 10, wherein a crystallized grain diameter of the core alloy after brazing is at least 100 μm.

12. The method as set forth in claim 9, wherein a crystallized grain diameter of the core alloy after brazing is at least 100 μm.

13. A method for producing an aluminum alloy brazing sheet having high strength, which method comprises the steps of:
   preparing a core alloy having one side and the other side, the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities;
   cladding an Al—Si-based filler alloy on one side of the core alloy;
   cladding a sacrificial anode material on the other side of the core alloy, the sacrificial anode material is composed of an aluminum alloy containing 2.0-6.0% Zn, the balance Al and unavoidable impurities; and
   subjecting the resultant cladded materials to hot rolling such that a beginning temperature of hot rolling ranges from 380 to 480° C., and such that a finishing temperature of hot rolling ranges from 200 to 280° C.,
   wherein, after the aluminum alloy brazing sheet is subjected to brazing, the core alloy features a metallic structure in which a density of intermetallic compounds having a grain diameter of at least 0.1 μm is at most ten grains per μm².

14. The method as set forth in claim 13, further comprising the step of subjecting the aluminum alloy brazing sheet to at least one annealing, after hot rolling, at a temperature range from 250 to 400° C. for at least one hour.

15. The method as set forth in claim 14, wherein a crystallized grain diameter of the core alloy after brazing is at least 100 μm.

16. The method as set forth in claim 13, wherein a crystallized grain diameter of the core alloy after brazing is at least 100 μm.

17. A method for producing an aluminum alloy brazing sheet having high strength, which method comprises the steps of:
   preparing a core alloy having one side and the other side, the core alloy is composed of an aluminum alloy containing 0.3-1.2% (mass %, the same applies the below) Si, 0.05-0.4% Fe, 0.3-1.2% Cu, 0.3-1.8% Mn, 0.05-0.6% Mg, and containing one or more elements selected from the group consisting of 0.02-0.3% Ti, 0.02-0.3% Zr, 0.02-0.3% Cr and 0.02-0.3% V, the balance of Al and unavoidable impurities;
   cladding an Al—Si-based filler alloy on one side of the core alloy;
   cladding a sacrificial anode material on the other side of the core alloy, the sacrificial anode material is composed of an aluminum alloy containing 2.0-6.0% Zn, and containing one or more elements selected from the group consisting of 0.05-1.0% Si, 0.05-1.8% Mn, 0.02-0.3% Ti and 0.02-0.3% V, the balance of Al and unavoidable impurities; and
   subjecting the resultant cladded materials to hot rolling such that a beginning temperature of hot rolling ranges from 380 to 480° C., and such that a finishing temperature of hot rolling ranges from 200 to 280° C.,
   wherein, after the aluminum alloy brazing sheet is subjected to brazing, the core alloy features a metallic structure in which a density of intermetallic compounds having a grain diameter of at least 0.1 μm is at most ten grains per μm².

18. The method as set forth in claim 17, further comprising the step of subjecting the aluminum alloy brazing sheet to at least one annealing, after hot rolling, at a temperature range from 250 to 400° C. for at least one hour.

19. The method as set forth in claim 18, wherein a crystallized grain diameter of the core alloy after said brazing process is at least 100 μm.

20. The method as set forth in claim 17, wherein a crystallized grain diameter of the core alloy after brazing is at least 100 μm.

* * * * *